(12) United States Patent
Qiu et al.

(10) Patent No.: US 11,863,361 B1
(45) Date of Patent: Jan. 2, 2024

(54) SYSTEMS AND METHODS FOR FREQUENCY DOMAIN LOCAL OSCILLATOR FREQUENCY OFFSET COMPENSATION

(71) Applicant: HUAWEI TECHNOLOGIES CO., LTD., Guangdong (CN)

(72) Inventors: Meng Qiu, Kanata (CA); Xuefeng Tang, Kanata (CA); Ahmed Mohamed Medra, Kanata (CA); Hossein Najafi, Kanata (CA); Ali Bakhshali, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/082,089

(22) Filed: Dec. 15, 2022

(51) Int. Cl.
*H04B 1/00* (2006.01)
*H04L 27/12* (2006.01)
*H04L 27/152* (2006.01)

(52) U.S. Cl.
CPC .......... *H04L 27/127* (2013.01); *H04L 27/152* (2013.01)

(58) Field of Classification Search
CPC ........................... H04L 27/127; H04L 27/152
USPC .......................................................... 375/262
See application file for complete search history.

(56) References Cited

U.S. PATENT DOCUMENTS

2005/0251321 A1* 11/2005 DeCarlo ............. G01M 15/046
701/114
2015/0172086 A1*  6/2015 Khoshgard ......... H04L 27/2657
375/260
2017/0054513 A1*  2/2017 Guo .................... H04B 10/6164

FOREIGN PATENT DOCUMENTS

WO     WO-2009019139 A1 *  2/2009  ........... H04L 27/265

* cited by examiner

*Primary Examiner* — Tanmay K Shah
(74) *Attorney, Agent, or Firm* — BCF LLP

(57) ABSTRACT

The disclosed systems and methods for frequency domain (FD) local oscillator frequency offset (LOFO) compensation. The method comprising: i) compensating, by an integer Fast Fourier Transform (FFT) bins-based oscillator, LOFO in a received signal by an integer number of FFT bins; and ii) compensating, by a fractional FFT bins-based oscillator, LOFO in the compensated signal by the integer FFT bins-based oscillator with a fine compensation resolution of a fractional number of FFT bins.

27 Claims, 12 Drawing Sheets

200

800

SYSTEMS AND METHODS FOR FREQUENCY DOMAIN LOCAL OSCILLATOR FREQUENCY OFFSET COMPENSATION

CROSS-REFERENCE TO RELATED APPLICATIONS

This is the first application filed for the instantly disclosed technology.

TECHNICAL FIELD

The present disclosure generally relates to digital communication and, in particular, to systems and methods for local oscillator frequency offset (LOFO) compensation.

BACKGROUND

Typically, an intradyne coherent optical communication system has a laser-based local oscillator (LO) which is free running at a receiver and, therefore, results in a frequency offset (LOFO) between the transmitter laser and the LO. LOFO manifests itself as a phase ramp on the time-domain (TD) signal which can be partially tracked by carrier phase recovery (CPR) algorithms. However, most CPR algorithms have limited capabilities of tracking LOFO or dealing with abrupt LOFO changes. Therefore, a separate LOFO compensation block is generally needed in the receiver digital signal processing (DSP).

One of the conventional ways for LOFO compensations is to apply an inverse phase ramp in TD. By doing so, the LOFO can be compensated effectively as long as there is no phase ambiguity and the LOFO estimation is accurate. On the other hand, given that many DSP algorithms are implemented in frequency-domain (FD), in various applications, FD LOFO compensations are preferred over the TD counterparts, as in these scenarios, it may be more difficult or complex to integrate the TD LOFO compensations with certain FD DSP algorithms.

One conventional way for LOFO compensations in FD is simply shifting the signal spectrum by samples, or equivalently, by fast Fourier transform (FFT) bins. One potential issue with this approach is the limited granularity especially when the signal sampling rate is high while the FFT size is limited. For example, with a sampling rate of 154 GSa/s and an FFT block size of 512, each FFT bin in FD corresponds to a bandwidth of about 300 MHz, which means LOFO can only be compensated with a 300-MHz resolution. Therefore, with this conventional FD LOFO compensation technique, the resolution may be insufficient especially for future high-speed transceivers.

With this said, there is an interest in developing FD LOFO compensation techniques having fine resolution.

SUMMARY

Typically, an intradyne coherent optical communication system has a laser-based local oscillator (LO) which is free-running at a receiver. Normally, an operating frequency of the LO is not synchronized with the laser-based oscillator at a transmitter. This fact may result in a non-zero frequency offset induced and applied to the received signal.

Developers of the present technology have devised systems and methods for frequency domain (FD) local oscillator frequency offset (LOFO) compensation.

In accordance with a first broad aspect of the present disclosure, there is provided a frequency domain (FD) local oscillator frequency offset (LOFO) compensation system comprising: an integer Fast Fourier Transform (FFT) bins-based oscillator configured to compensate LOFO in a received signal by an integer number of FFT bins; and a fractional FFT bins-based oscillator configured to further compensate LOFO in the compensated signal by the integer FFT bins-based oscillator with a fine compensation resolution of a fractional number of FFT bins.

In accordance with any embodiments of the present disclosure, the integer FFT bins-based oscillator compensates LOFO by shifting the spectrum of the received signal by an integer number of FFT bins.

In accordance with any embodiments of the present disclosure, the fractional FFT bins-based oscillator further compensates the LOFO by performing convolution of the spectrum of the compensated signal by the integer FFT bins-based oscillator, with an FD impulse response of the fractional FFT bins-based oscillator.

In accordance with any embodiments of the present disclosure, the convolution between the spectrum of the compensated signal and the FD impulse response of the fractional FFT bins-based oscillator is performed by a Finite Impulse Response (FIR) filter after truncating the FD impulse response to finite number of taps.

In accordance with any embodiments of the present disclosure, the FD impulse response of the fractional FFT bins-based oscillator is calculated based on a time-domain (TD) window applied to TD signal samples associated with the received signal.

In accordance with any embodiments of the present disclosure, the fractional FFT bins-based oscillator is further configured to distort the TD signal samples.

In accordance with any embodiments of the present disclosure, the FD impulse response and the TD window of the fractional FFT bins-based oscillator are defined by a Raised Cosine (RC) function.

In accordance with any embodiments of the present disclosure, the TD window is defined as:

$$H(t) = \begin{cases} 1, & |t| \leq \frac{1-\alpha}{2F_{ref}} \\ \frac{1}{2}\left[1 + \cos\left(\frac{\pi F_{ref}}{\alpha}\left[|t| - \frac{1-\alpha}{2F_{ref}}\right]\right)\right], & \frac{1-\alpha}{2F_{ref}} < |t| \leq \frac{1+\alpha}{2F_{ref}} \\ 0, & \text{otherwise} \end{cases}$$

where $F_{ref}$ is a reference frequency related to a width of the TD window, $\alpha$ is a roll-off factor of the RC and t is a given instant of time.

In accordance with any embodiments of the present disclosure, the FD impulse response of the fractional FFT bins-based oscillator is defined as:

$$h(f) = \begin{cases} \frac{\pi}{4F_{ref}}\text{sinc}\left(\frac{1}{2\alpha}\right), & f = \pm\frac{F_{ref}}{2\alpha} \\ \frac{1}{F_{ref}}\text{sinc}\left(\frac{f}{F_{ref}}\right)\frac{\cos\left(\frac{\pi \alpha f}{F_{ref}}\right)}{1-\left(\frac{2\alpha f}{F_{ref}}\right)^2}, & \text{otherwise} \end{cases}$$

where $F_{ref}$ is a reference frequency related to a width of the TD window, $\alpha$ is a roll-off factor of the RC and f is a given frequency.

In accordance with any embodiments of the present disclosure, the FD impulse response of the fractional FFT bins-based oscillator is calculated based on applicable filter design algorithm.

In accordance with any embodiments of the present disclosure, the system further comprises a chromatic dispersion compensator (CDC) configured to compensate chromatic dispersion in the received signal.

In accordance with any embodiments of the present disclosure, the system further comprises a controller configured to initially turning off the fractional FFT bins-based oscillator, and turning on the fractional FFT bins-based oscillator during tuning of the LOFO compensation system.

In accordance with any embodiments of the present disclosure, the controller is further configured to: determine whether a re-tuning is required for the FD LOFO compensation system; and in the event of determining that the re-tuning is required, determine a number of bins by which the integer FFT bins-based oscillator is to be re-configured, and cause the fractional FFT bins-based oscillator to iteratively be configured to different frequency shifts until the fractional FFT bins-based oscillator is finally configured to a zero frequency shift.

In accordance with a second broad aspect of the present disclosure, there is provided a frequency domain (FD) local oscillator frequency offset (LOFO) compensation method comprising: compensating, by an integer Fast Fourier Transform (FFT) bins-based oscillator, LOFO in a received signal by an integer number of FFT bins; and compensating, by a fractional FFT bins-based oscillator, LOFO in the compensated signal by the integer FFT bins-based oscillator with a fine compensation resolution of a fractional number of FFT bins.

In accordance with any embodiments of the present disclosure, the method further comprises distorting, by the fractional FFT bins-based oscillator, the TD signal samples.

In accordance with any embodiments of the present disclosure, the method further comprises compensating, by a Chromatic Dispersion Compensator (CDC), chromatic dispersion in the received signal.

In accordance with any embodiments of the present disclosure, the method further comprises initially turning off the fractional FFT bins-based oscillator, by a controller, and turning on, by the controller, the fractional FFT bins-based oscillator, during tuning of an FD LOFO compensation system.

In accordance with any embodiments of the present disclosure, the method further comprises: determining, by the controller, whether a re-tuning is required for the FD LOFO compensation system; and in the event of determining that the re-tuning is required, determining, by the controller, a number of bins by which the integer Fast Fourier Transform (FFT) is to be re-configured, and causing the fractional FFT bins-based oscillator to iteratively be configured to different frequency shifts until the fractional FFT bins-based oscillator is finally configured to a zero frequency shift.

In accordance with a third broad aspect of the present disclosure, there is provided a frequency domain (FD) local oscillator frequency offset (LOFO) compensation system comprising: a fractional Fast Fourier Transform (FFT) bins-based oscillator configured to compensate LOFO in a received signal with a fine compensation resolution of a fractional number of FFT bins; and an integer FFT bins-based oscillator configured to further compensate LOFO in the compensated signal by the fractional FFT bins-based oscillator by an integer number of FFT bins.

BRIEF DESCRIPTION OF THE FIGURES

Further features and advantages of the present disclosure will become apparent from the following detailed description, taken in combination with the appended drawings, in which.

Figure 1:
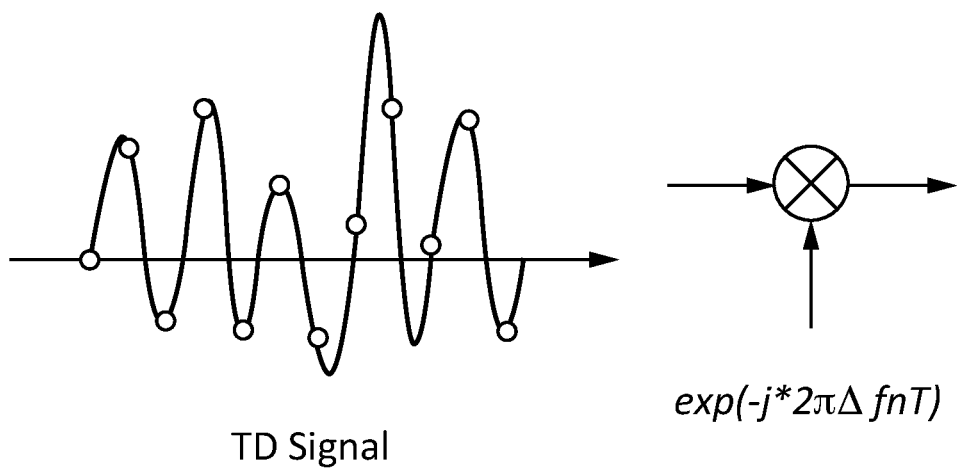
FIG. 1 (Prior Art) illustrates a conventional time-domain (TD) local oscillator frequency offset (LOFO) compensation technique.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes systems and methods for frequency-domain (FD) local oscillator frequency offset (LOFO) compensation.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in alike fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure describes systems and methods for FD LOFO compensation.

Typically, an intradyne coherent optical communication system has a laser-based local oscillator (LO) which is free-running at a receiver. Normally, an operating frequency of the LO is not synchronized with the laser-based oscillator at a transmitter. This fact may result in a non-zero frequency offset induced and applied to the received signal.

To this end, a local oscillator frequency offset (LOFO) compensation is typically required at the receiver, and more specifically, in the receiver digital signal processing (DSP). Various compensations techniques have been suggested in the art. FIG. 1 (Prior Art) illustrates a conventional time-domain (TD) LOFO compensation technique 100, which may be realized by applying an inverse phase ramp on the received signal. Specifically, a phase compensation term is calculated based on the estimated LOFO, which requires one exponential calculation or equivalent operation for each sample. Then another complex multiplication is required to apply the phase compensation term to the TD signal samples. One of the concerns with the conventional compensation technique 100 is its integration with certain DSP functionalities which are implemented in the frequency-domain (FD).

Figure 2:
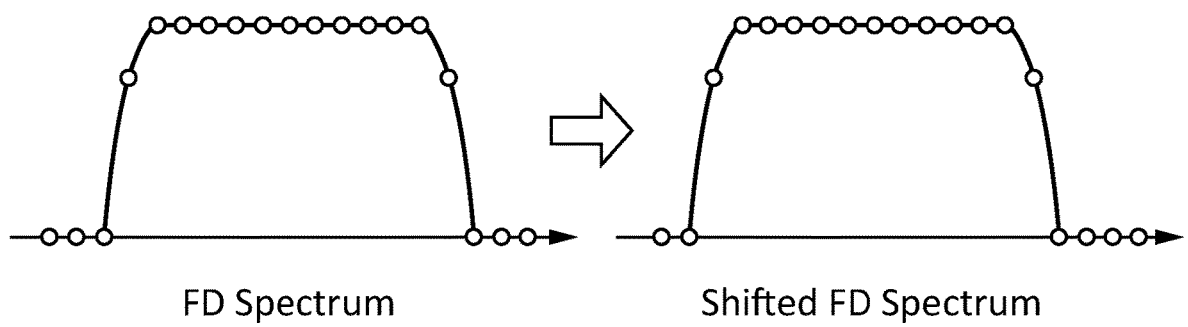
FIG. 2 (Prior Art) illustrates an example of a frequency domain (FD) signal spectrum and a shifted FD signal spectrum, in accordance with a conventional FD LOFO compensation technique that shifts the signal spectrum by fast Fourier transform (FFT) bins.

There were also LOFO compensation techniques that can be implemented in FD. In most current coherent optical communication systems, the initial received TD signals may be converted into FD at certain stages of the receiver DSP mainly for performing chromatic dispersion compensation. The FD LOFO compensation may be employed when the received signal is in FD in the form of signal spectrum. One simple way of this type of compensation is to shift the signal spectrum by samples or FFT bins. FIG. 2 (Prior Art) illustrates an example of an FD signal spectrum and a shifted FD signal spectrum, in accordance with this conventional FD LOFO compensation technique. Even though this technique is simple in terms of implementation, the compensation resolution may be insufficient especially for future high-speed transceivers when the signal sampling rate is high while the FFT size is limited.

With this said, there is an interest in developing FD LOFO compensation techniques having fine resolution.

Figure 3:
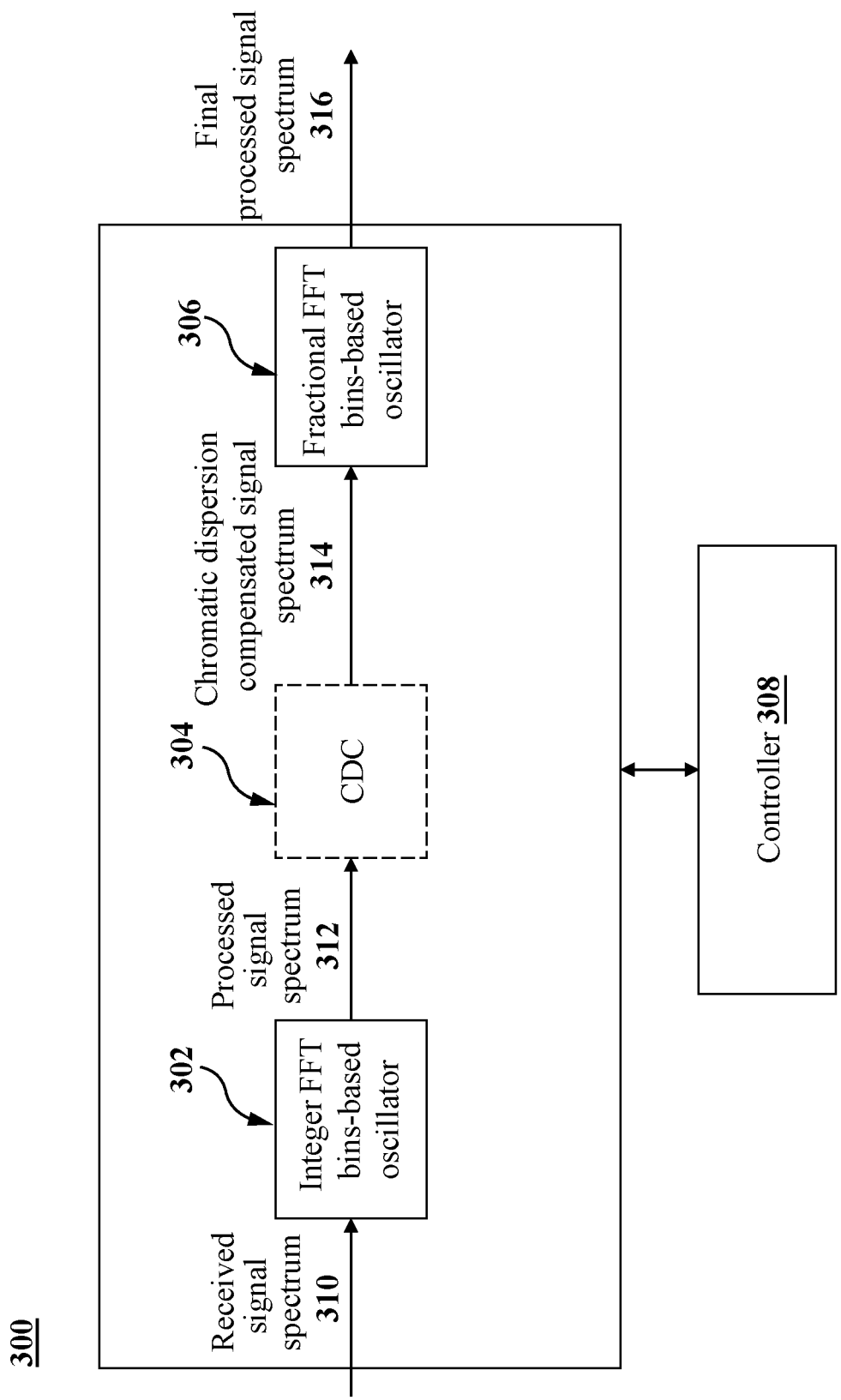
FIG. 3 illustrates a representative example of a high-level functional block diagram of an FD LOFO compensation system, in accordance with various non-limiting embodiments of the present disclosure.

FIG. 3 illustrates an example of a high-level functional block diagram of an FD LOFO compensation system 300, in accordance with various non-limiting embodiments of the present disclosure. As shown, the FD LOFO compensation system 300 may include an integer FFT bins-based oscillator 302, a chromatic dispersion compensator (CDC) 304, a fractional FFT bins-based oscillator 306 and a controller 308. It is to be noted that the FD LOFO compensation system 300 may include other components. However, for the purpose of simplicity, such components have been omitted from the FIG. 3.

The integer FFT bins-based oscillator 302 may be configured to receive an FD signal referred to as a received signal spectrum 310. The received signal spectrum 310 may be a digital signal spectrum corresponding to an optical input signal. The optical input signal may be converted to the received signal spectrum 310 by any suitable hardware, for example, optical-to-electrical convertor, and by any preceding DSP, for example, FFT that converts the TD signal into FD, without limiting the scope of present disclosure.

Free-running operation of the LO at the receiver (not illustrated) may result in a non-zero LOFO induced and applied to the received signal spectrum 310.

The integer FFT bins-based oscillator 302 may be configured to compensate part of the LOFO that corresponds to integer number of FFT bins in the received signal spectrum 310.

Figure 4:
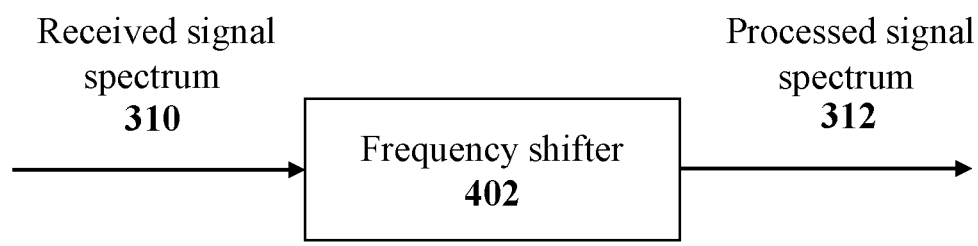
FIG. 4 illustrates a representative example of an integer FFT bins-based oscillator, in accordance with various non-limiting embodiments of the present disclosure.

It is to be noted that how the integer FFT bins-based oscillator 302 is implemented should not limit a scope of the present disclosure. FIG. 4 illustrates a representative example 400 of the integer FFT bins-based oscillator 302, in accordance with various non-limiting embodiments of the present disclosure. As shown, the integer FFT bins-based oscillator 302 may include a frequency shifter 402 which applies a bin shifting operation on the received signal spectrum 310. It is to be noted that the integer FFT bins-based oscillator 302 may include other components, however, such components have been omitted from FIG. 4 for the purpose of simplicity.

The frequency shifter 402 may be configured to provide a shift by k bins to the signal spectrum, where k may be an integer value. The frequency shifter 402 may generate a processed signal spectrum 312 from the received signal spectrum 310.

Returning to FIG. 3, the integer FFT bins-based oscillator 302 may provide the processed signal spectrum 312 to the CDC 304. The CDC 304 may be configured to compensate chromatic dispersion in the processed signal spectrum 312. The CDC 304 may generate chromatic dispersion compensated signal spectrum 314.

In various non-limiting embodiments, the CDC 304 may be optional in the FD LOFO compensation system 300. Additionally, the CDC 304 may be located at other suitable location either inside or outside the FD LOFO compensation system 300 without limiting the scope of present disclosure. It is to be noted that how the CDC 304 compensates the chromatic dispersion should not limit the scope of present disclosure.

Figure 5:
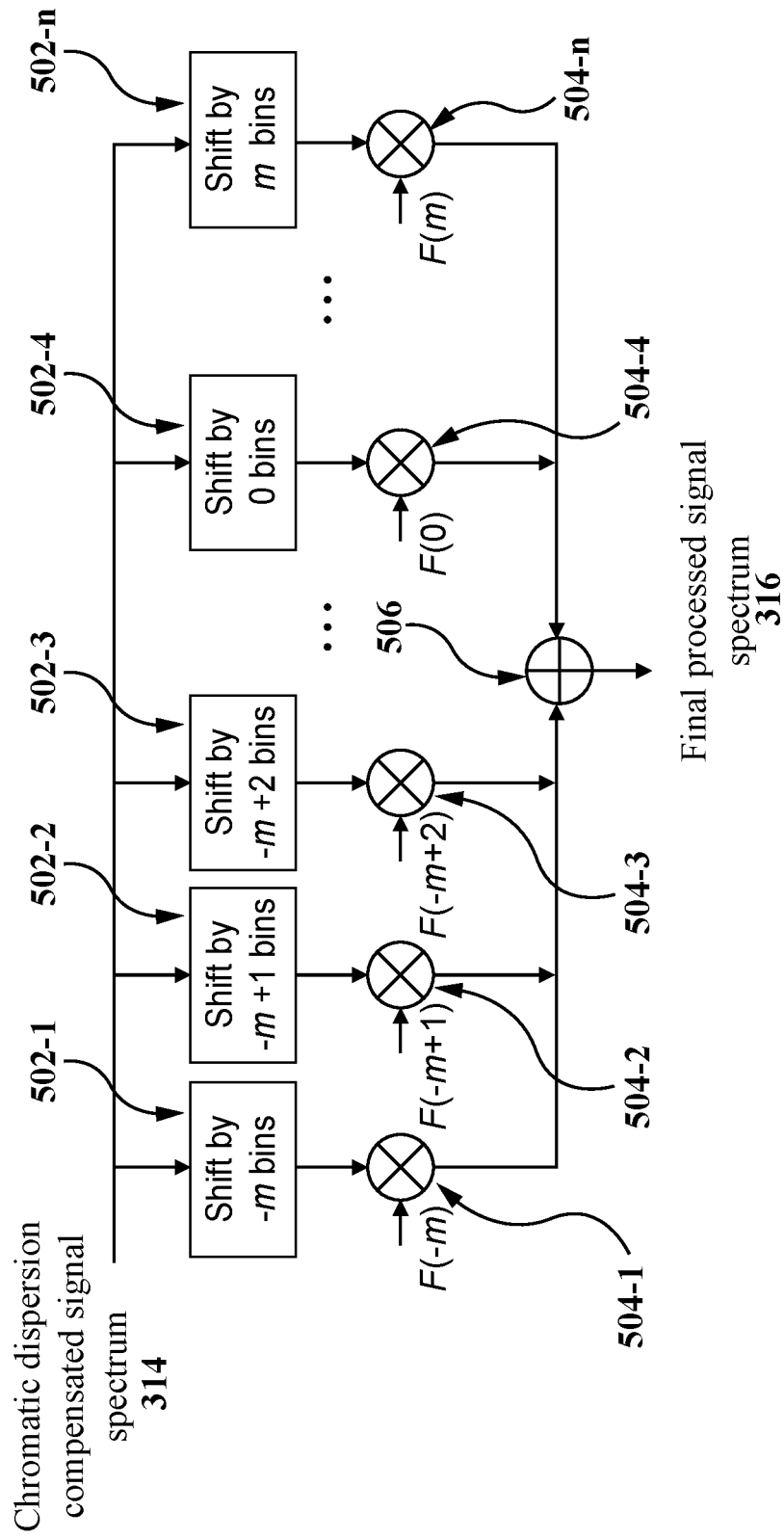
FIG. 5 illustrates a representative example of the implementation of a fractional FFT bins-based oscillator, in accordance with various non-limiting embodiments of the present disclosure.

The CDC 304 may forward the chromatic dispersion compensated signal spectrum 314 towards the fractional FFT bins-based oscillator 306. It is to be noted that how the fractional FFT bins-based oscillator 306 is physically implemented should not limit a scope of the present disclosure. FIG. 5 illustrates a representative example 500 of the fractional FFT bins-based oscillator 306, in accordance with various non-limiting embodiments of the present disclosure. As shown, the fractional FFT bins-based oscillator 306 may include a plurality of spectrum shifters 502-1, 502-2, 502-3, 502-4, . . . 502-$n$, a plurality of multipliers 504-1, 504-2, 504-3, 504-4, . . . 504-$n$, and an adder 506. It is to be noted that the fractional FFT bins-based oscillator 306 may include other components, however, such components have been omitted from FIG. 5 for the purpose of simplicity.

The plurality of spectrum shifters 502-1, 502-2, 502-3, 502-4, . . . 502-$n$ may be configured to shift (circularly or linearly) the chromatic dispersion compensated signal spectrum 314 by integer number of bins. The plurality of multipliers 504-1, 504-2, 504-3, 504-4, . . . 504-$n$ may be configured to multiply filter coefficients associated with the fractional FFT bins-based oscillator 306 with the shifted copies of the chromatic dispersion compensated signal spectrum 314. The adder 506 may be configured to add the outputs from the plurality of multipliers 504-1, 504-2, 504-3, 504-4, . . . 504-$n$ to generate a final processed signal spectrum 316. The entire process 500 achieves an effective frequency shift of fractional number of FFT bins for the reason elaborated below.

In certain embodiments, the fractional FFT bins-based oscillator 306 may be configured to further compensate LOFO in the compensated signal by the integer FFT bins-based oscillator 302 with a fine compensation resolution of a fractional number of FFT bins.

In order to effectively achieve a frequency shift of a fractional number of FFT bins, the fractional FFT bins-based oscillator 306 may perform a convolution of the chromatic dispersion compensated signal spectrum 314 with an impulse response of the fractional FFT bins-based oscillator 306.

In the convolution calculation, the required fractional-FFT-bin frequency shift of the convolution output is realized by frequency shifting the baseline impulse response of the fractional FFT bins-based oscillator 306.

The baseline impulse response (in FD) of the fractional FFT bins-based oscillator 306 may have an analytical form g(f), and an arbitrary frequency shift $f_0$ may be achieved by computing $g(f-f_0)$.

In one example, the impulse response of the fractional FFT bins-based oscillator 306 may be transformed based on a rectangular window function in TD. In this case, the FD impulse response may have a sinc shape. The fractional FFT bins-based oscillator 306 may perform the convolution between the chromatic dispersion compensated signal spectrum 314 with a frequency-shifted sinc shaped impulse response. It is to be noted that the sinc function may have an analytical form g(f), so the frequency shift may be realized by offsetting the frequency grids in the analytical computations of the impulse response, and this shift may be any fractional amount of FFT bins. The entire process may be equivalent to applying a phase ramp on the TD signal samples that are selected by the rectangular window.

To reduce hardware complexity and for the ease of implementation, the FD impulse response may be truncated to a reasonably long FIR filter. In other words, the convolution between the signal spectrum and the impulse response may be implemented in the form of applying an FIR filter on the signal spectrum, as shown in FIGS. Generally, to shorten the FD impulse response and consequently simplify the FIR filter, the corresponding TD window may need to have a smooth window edge, or in other words, a smooth transition from high power to low power. It is noted that the rectangular window in the previous example may have an abrupt power change at the window edge, so the corresponding sinc shape impulse response may be relatively long.

To design a "better" TD window shape that has a shorter FD impulse response, the fractional FFT bins-based oscillator 306 may rely on the use of the overlap-and-save (OLS) technique. The use of OLS may be referred to as, after the fractional FFT bins-based oscillator 306 and other applicable FD DSP, a certain percentage of the data samples (for example, 50%) may be discarded when the signal is converted back to TD. For the following illustration, 50% of OLS is assumed unless specified otherwise. It is to be noted that this assumption is only for illustration purpose and should not limit the scope of present disclosure.

Considering a significant portion of TD samples may finally be discarded, distortion may be added to those samples during the TD windowing by the fractional FFT bins-based oscillator 306 without degrading the system performance. Such distortion may be designed specifically to facilitate a smooth transition between high power and low power at the TD window edge, and at the same time, introduce no or insignificant distortion on the samples that are kept for the DSP afterwards.

To achieve a smooth TD window edge and an appropriate distortion control at the same time, the definition of RC pulse may be used as an example in various non-limiting embodiments of the present disclosure. To define the window in TD, the RC function that may have the analytical form below (equation 1) may be used.

$$H(t) = \begin{cases} 1, & |t| \leq \frac{1-\alpha}{2F_{ref}} \\ \frac{1}{2}\left[1 + \cos\left(\frac{\pi F_{ref}}{\alpha}\left[|t| - \frac{1-\alpha}{2F_{ref}}\right]\right)\right], & \frac{1-\alpha}{2F_{ref}} < |t| \leq \frac{1+\alpha}{2F_{ref}} \\ 0, & \text{otherwise} \end{cases} \quad (1)$$

where $F_{ref}$ may be a reference frequency that may be related to the TD window width, and $\alpha$ may be a roll-off factor of the RC definition. Note that in our design, equation 1 may be used to define a TD window, while in many conventional applications the similar form of equation 1 may be used to define an FD passband. In various non-limiting embodiments, the windowing function defined in equation 1 may be applied on TD samples, and to keep the samples in the middle of the window undistorted while introducing controlled distortion on the samples at the window edge. The FD impulse response corresponding to the TD window defined in equation 1 is illustrated as equation 2.

$$h(f) = \begin{cases} \left(\frac{\pi}{4F_{ref}}\right)\text{sinc}\left(\frac{1}{2\alpha}\right), & f = \pm\frac{F_{ref}}{2\alpha} \\ \frac{1}{F_{ref}}\text{sinc}\left(\frac{f}{F_{ref}}\right)\frac{\cos\left(\frac{\pi\alpha f}{F_{ref}}\right)}{1-\left(\frac{2\alpha f}{F_{ref}}\right)^2}, & \text{otherwise} \end{cases} \quad (2)$$

Corresponding to multiplying a window defined in equation 1 with the TD signal samples, the FD impulse response defined in equation 2 may be used for the convolution with the signal spectrum. As mentioned earlier, such convolution may be implemented in the form of FIG. 5 after truncating the impulse response to appropriate FIR taps. Based on the properties of RC definition, when $\alpha$ is 0, the TD window function may degenerate to a rectangular window. Also, when the $F_{ref}$ is fixed and the $\alpha$ is increased, more signal samples may get distorted by the TD window, and at the same time, the FD impulse response defined in equation 2 may have less significant tails. To maximize the portion of undistorted TD signal samples within an FFT block given a defined $\alpha$, a value of $F_{ref}$ may be set to $f_s/N_{FFT}$, where $f_s$ may be the sampling rate of the received signal and $N_{FFT}$ may the size of the FFT.

Figure 6:
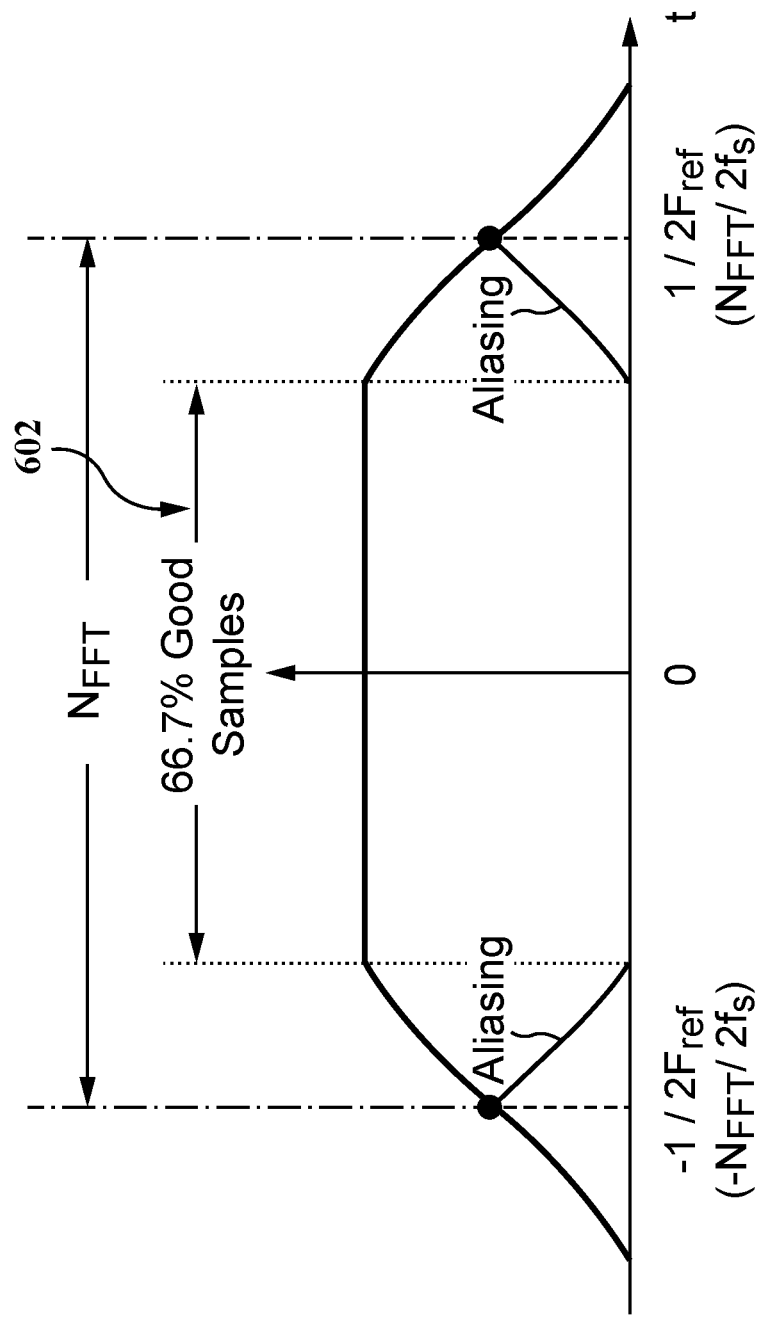
FIGS. 6 and 7 illustrate representative examples corresponding to TD raised cosine (RC) window shapes with different roll-off factors ($\alpha$) of ⅓ and ½ respectively in the fractional FFT bins-based oscillator, in accordance with various non-limiting embodiments of the present disclosure.
Figure 7:
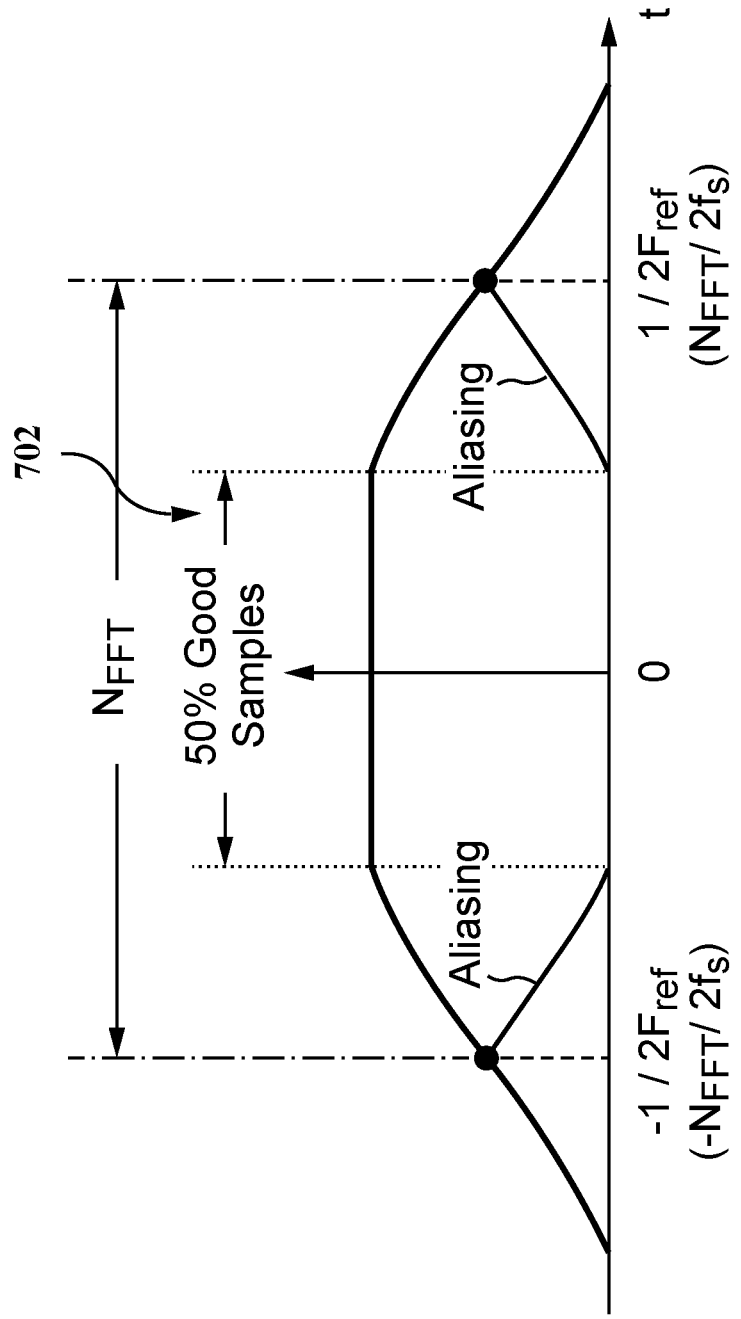

FIGS. 6 and 7 illustrate representative examples 600 and 700 for the TD RC window shapes with $\alpha=\frac{1}{3}$ and $\alpha=\frac{1}{2}$ respectively, in accordance with various non-limiting embodiments of the present disclosure. Specifically, the representative example 600 illustrates a TD RC window shape with $\alpha=\frac{1}{3}$. In this example, about $\frac{2}{3}$ of the TD signal samples will not be distorted (or only be distorted insignificantly) by the TD window when $F_{ref}$ is set to $f_s/N_{FFT}$. The representative example 700 illustrates a TD RC window shape with $\alpha=\frac{1}{2}$. In this example, about $\frac{1}{2}$ of the TD signal samples will not be distorted (or only be distorted insignificantly) by the TD window when $F_{ref}$ is set to $f_s/N_{FFT}$. In general, when $F_{ref}$ is set to $f_s/N_{FFT}$, $\alpha$ is roughly equal to a ratio of the distorted samples within an FFT block, and $1-\alpha$ is roughly equal to a ratio of the undistorted (or insignificantly distorted) samples within an FFT block.

It is to be noted that with an increase in $\alpha$, the FD impulse response may have less significant tails. As a result, the fractional FFT bins-based oscillator 306 with fewer FIR taps may be implemented.

Figure 8:
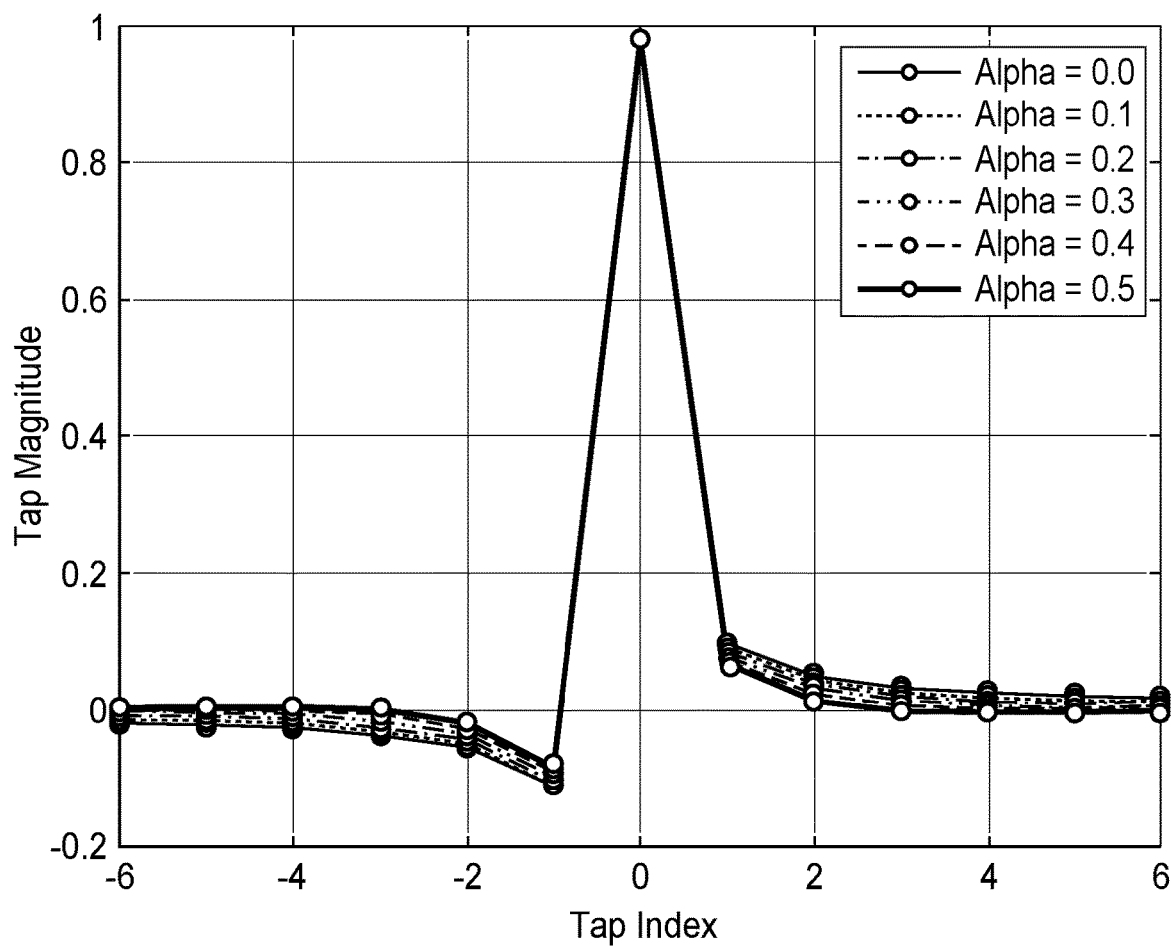
FIGS. 8 and 9 illustrate representative examples of FD impulse responses with different values of a to compensate 0.1-bin of LOFO in the fractional FFT bins-based oscillator, in accordance with various non-limiting embodiments of the present disclosure.
Figure 9:
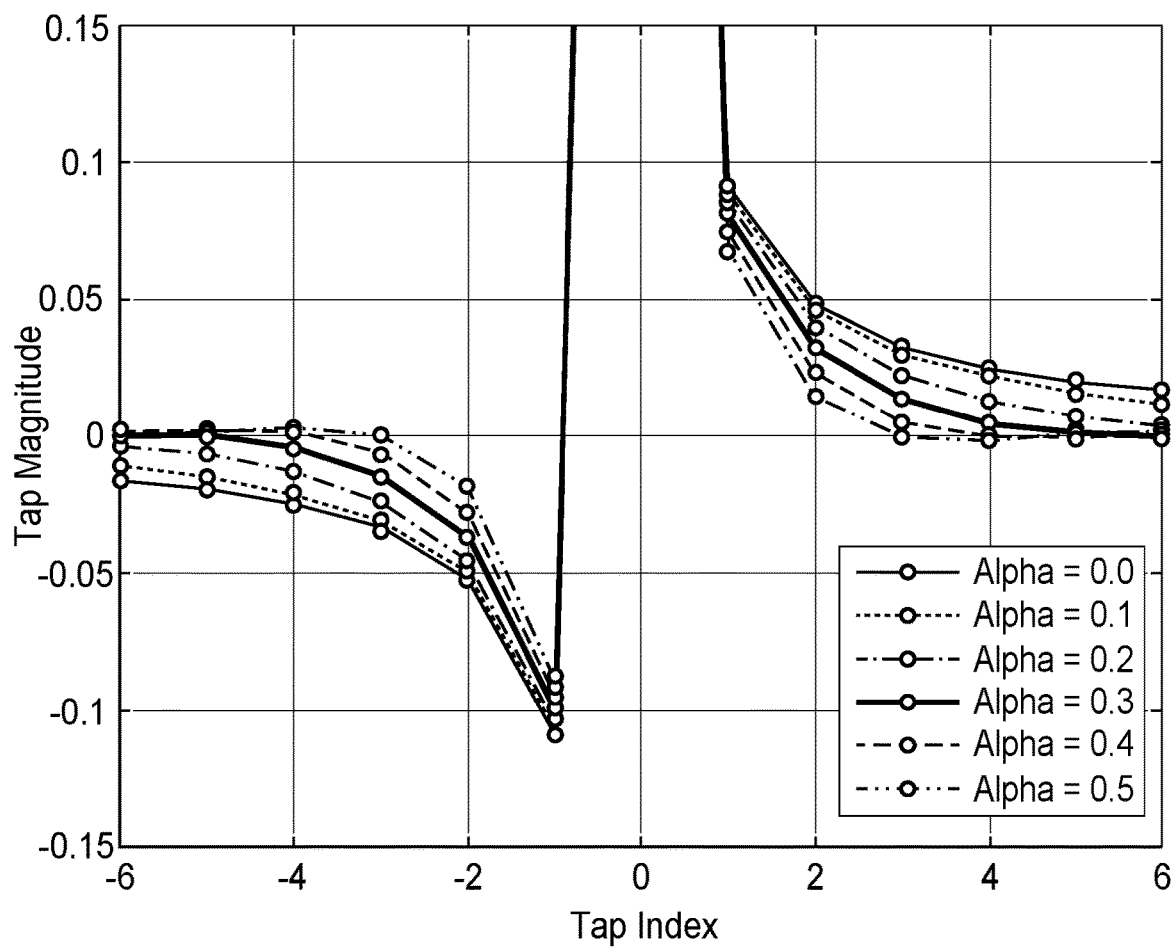

FIGS. 8 and 9 illustrate representative examples of the FD impulse responses 800 and 900 in the fractional FFT bins-based oscillator 306 with different values of $\alpha$ to compensate 0.1-bin of LOFO, in accordance with various non-limiting embodiments of the present disclosure. It is to be noted that FIG. 9 is an augmented version of FIG. 8. When $\alpha$ is sufficiently large, the tail of the impulse responses 800 and 900 may be insignificant, resulting in a potential of reducing the number of FIR taps.

Figure 10:
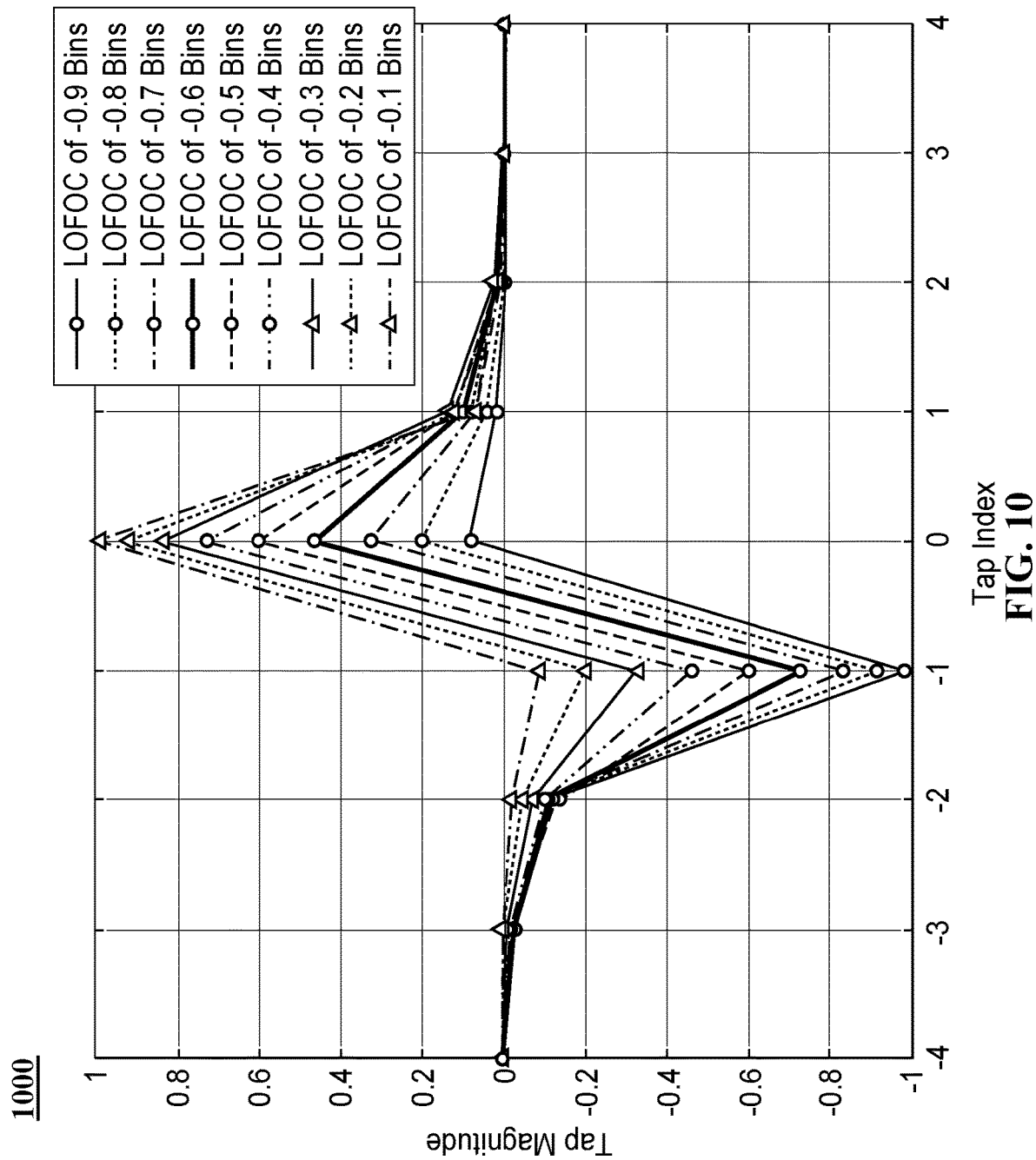
FIGS. 10 and 11 illustrate representative examples of FD impulse responses corresponding to various target LOFO compensations (LOFOC) in the fractional FFT bins-based oscillator when $\alpha$ is 0.5, in accordance with various non-limiting embodiments of the present disclosure.
Figure 11:
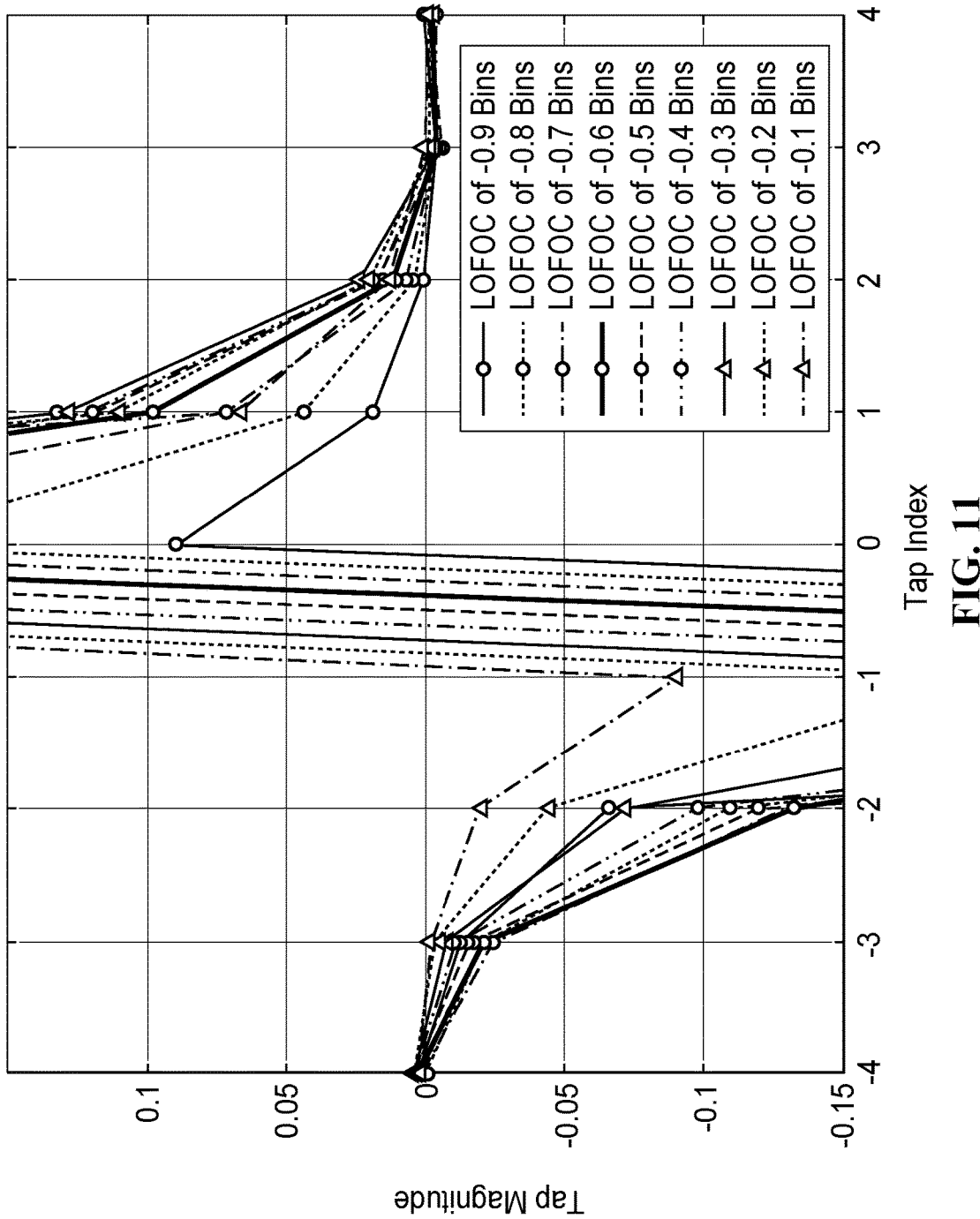

FIGS. 10 and 11 illustrate representative examples of the FD impulse responses 1000 and 1100 in the fractional FFT bins-based oscillator 306 corresponding to the compensation of various LOFOs when α is 0.5, in accordance with various non-limiting embodiments of the present disclosure. It is to be noted that FIG. 11 is an augmented zoomed version of FIG. 10. As shown, the taps at indices −4/+4 illustrate close-to-zero magnitude, so the FD impulse response of the fractional FFT bins-based oscillator 306 may be truncated to 7 FIR taps for the compensation of these LOFOs.

Based on values of $F_{ref}$ and α, the controller 308 (as shown in FIG. 3) may compute the FD impulse responses for the required LOFO compensations using equation 2, construct the FIR taps accordingly, and save these taps in a look-up table (LUT) such that the taps may be read directly by the controller 308 when applying the frequency shift. It is to be noted that the RC FD impulse response for a negative target LOFO compensation may be simply flipped compared to the one for a positive target LOFO compensation, hence, the FIR taps for either positive or negative target LOFO compensations may be saved in a computer-readable memory (not illustrated), and the taps can simply be flipped for the other case when they get applied.

It is to be noted that the FD impulse response computed based on equation 2 may only include real taps. In practice, the controller 308 may select a different location of the TD undistorted window (similar to the undistorted windows 602 and 702 illustrated in FIGS. 6 and 7). To achieve this, the controller 308 may apply a phase ramp to the FD impulse response calculated by equation 2, meaning the FIR taps may not be purely real numbers with arbitrary amount of window location shift.

On the other hand, for simplicity in practice, the samples that are kept after OLS may be more likely to be located at a first or second half of a block, the middle half of a block, or a quarter at both ends of a block (combined to get a total length of half a block), assuming 50% OLS. In order to move the undistorted window to these locations, the amount of the window location shift in TD is generally ¼ or ½ of an FFT block. Correspondingly, the controller 308 may simply need to further toggle the FIR taps calculated by equation 2 between real/imaginary numbers or positive/negative numbers, based on the amount and direction of the window shift. As a result, in these cases the FD impulse response taps may still be purely real or imaginary numbers, thereby saving around 50% of the complexity compared to the operations of complex numbers when applying the FIR taps to the signal spectrum.

Combining the aforementioned implementation details, it is contemplated that the LUT that saves the FIR taps may be quite simple. By way of example, to compensate LOFO that is equal or smaller than half FFT bin and achieve a resolution of 0.1 bins, the LUT may include 5 sets of real-number FIR taps corresponding to the frequency shift of (0.1, 0.2, 0.3, 0.4, 0.5) FFT bins, where pure real numbers and pure imaginary numbers are not differentiated in terms of resources for saving. This may result to a 5×7 real-number LUT when assuming the number of FIR taps is 7.

When implementing the integer FFT bins-based oscillator 302 or fractional FFT bins-based oscillator 306, an additional phase term may be required to assure a phase continuity. This additional phase term may represent a general phase offset of each processed block to make the phase continuous at the boundaries of adjacent blocks in the final TD signal.

The FIR taps of the fractional FFT bins-based oscillator 306 may be constructed based on other applicable filter design techniques such as Parks-McClellan filter design algorithm, without limiting the scope of present disclosure. It is noted that the TD window in the disclosure can be treated as the filter passband in those filter design methods.

It is to be noted that even though in various embodiments of the present disclosure, the fractional FFT bins-based oscillator 306 has been illustrated to be implemented after the integer FFT bins-based oscillator 302, in various non-limiting embodiment, the fractional FFT bins-based oscillator 306 may be implemented prior to the integer FFT bins-based oscillator 302 without limiting the scope of the present disclosure. In such embodiment, the fractional FFT bins-based oscillator 306 may be configured to compensate LOFO in a received signal with a fine compensation resolution of a fractional number of FFT bins, and the integer FFT bins-based oscillator 302 may be configured to further compensate LOFO in the compensated signal by the fractional FFT bins-based oscillator 306 by an integer number of FFT bins.

Utilizing the fine-resolution benefit of the fractional FFT bins-based oscillator 306, in certain embodiments of the present disclosure, the FD LOFO compensation system 300 may be used for all-FD digital frequency tracking to cope with the LOFO wandering over time. In one example, the integer FFT bins-based oscillator 302 may initially be set to the optimal operation parameters, but as the effect of LOFO wandering accumulates, these operation parameters may become sub-optimal, and the integer FFT bins-based oscillator 302 may need a re-tuning by one or more FFT bins. Due to the limited resolution of the integer FFT bins-based oscillator 302, such re-tuning means the DSP blocks afterwards, such as the carrier phase recovery (CPR), may experience an abrupt residual LOFO change as large as hundreds of MHz, which may impact the functioning of specific DSP blocks, cause burst errors, and degrade the overall system performance.

In one example of the solutions to the aforementioned problem, the controller 308 may initially turn off the fractional FFT bins-based oscillator 306 during the "steady state", and temporarily turn it on when the integer FFT bins-based oscillator 302 needs a re-tuning. By coordinating the integer FFT bins-based oscillator 302 and the fractional FFT bins-based oscillator 306, an overall smooth transition of the residual LOFO (rather than an abrupt change when the integer FFT bins-based oscillator 302 is re-tuned alone) may be achieved with the FD LOFO compensation system 300.

Below is a more detailed example of the re-tuning process. An FD LOFO compensation system 300 is assumed to merely rely on the integer FFT bins-based oscillator 302 for LOFO compensation in the "steady states". The controller 308 may be configured to determine whether a re-tuning is required for the integer FFT bins-based oscillator 302. In the event of determining that a re-tuning is required, the controller 308 may determine a number of bins by which the integer FFT bins-based oscillator 302 is to be adjusted. The controller 308 may re-configure the integer FFT bins-based oscillator 302 to a new setting that features a different integer number of FFT bin shift. Meanwhile, the controller 308 may turn on the fractional FFT bins-based oscillator 306 and configure it accordingly such that the overall residual LOFO change after the FD LOFO compensation system 300 is sufficiently small. Afterwards, the following DSP may be converged to the new residual LOFO with insignificant or acceptable performance degradation. Then the controller 308 keeps re-configuring the fractional FFT bins-based oscillator 306 to gradually release the residual LOFO change coming from the re-tuning of the integer FFT bins-based oscillator 302. Such iteration continues, and the entire re-tuning process is completed when the target LOFO compensation of the fractional FFT bins-based oscillator 306 becomes zero. In other words, the controller 308 may cause the fractional FFT bins-based oscillator 306 iteratively be configured to different frequency shifts until the fractional FFT bins-based oscillator 306 becomes configured to a zero frequency shift. Finally, the controller 308 turns off the fractional FFT bins-based oscillator 306, and the system turns back into steady state.

Figure 12:
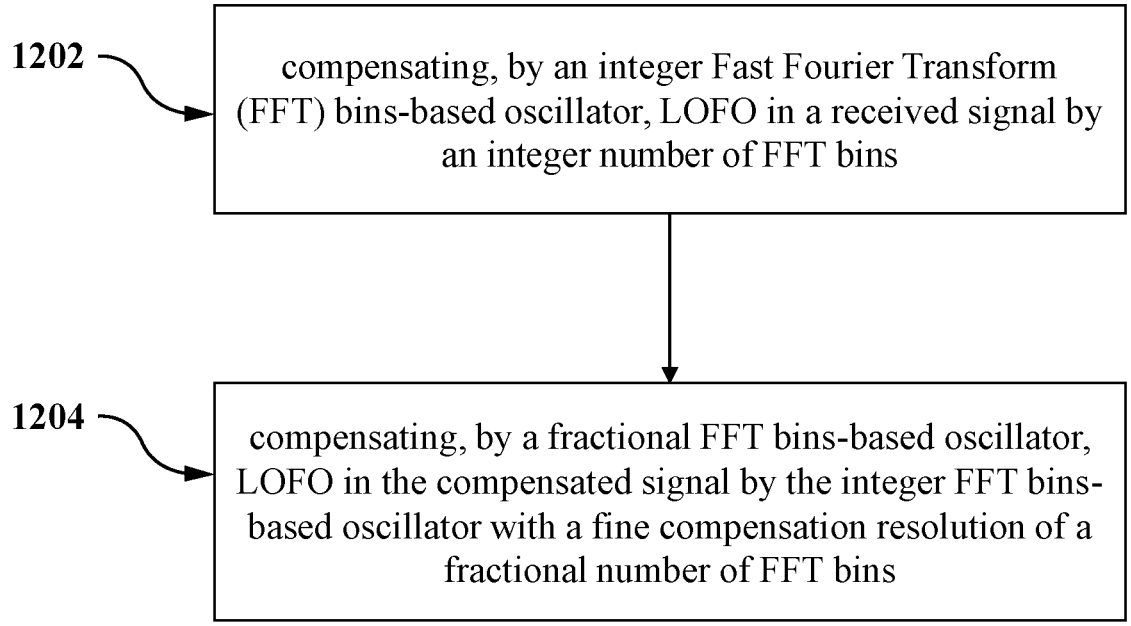
FIG. 12 illustrates a flowchart of a process implemented over the FD LOFO compensation system for compensating LOFO.

FIG. 12 illustrates a flowchart of a process 1200 implemented over the FD LOFO compensation system for compensating LOFO. As shown, the process 1200 begins at step 1202, where an integer Fast Fourier Transform (FFT) bins-based oscillator compensates LOFO in a received signal by an integer number of FFT bins. As previously noted, the integer FFT bins-based oscillator 302 may be configured to receive an FD signal referred to as a received signal spectrum 310. The integer FFT bins-based oscillator 302 may be configured to compensate part of the LOFO that corresponds to integer number of FFT bins in the received signal spectrum 310.

At step 1204, a fractional FFT bins-based oscillator compensates LOFO in the compensated signal by the integer FFT bins-based oscillator with a fine compensation resolution of a fractional number of FFT bins. As previously noted, the fractional FFT bins-based oscillator 306 may be configured to further compensate LOFO in the compensated signal by the integer FFT bins-based oscillator 302 with the fine compensation resolution of a fractional number of FFT bins.

It is to be understood that the operations and functionality of the FD LOFO compensation system 300, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A frequency domain (FD) local oscillator frequency offset (LOFO) compensation system comprising:
   an integer Fast Fourier Transform (FFT) bins-based oscillator configured to compensate LOFO in a received signal by an integer number of FFT bins; and
   a fractional FFT bins-based oscillator configured to further compensate LOFO in the compensated signal by the integer FFT bins-based oscillator with a fine compensation resolution of a fractional number of FFT bins.

2. The FD LOFO compensation system of claim 1, wherein the integer FFT bins-based oscillator compensates LOFO by shifting the spectrum of the received signal by an integer number of FFT bins.

3. The FD LOFO compensation system of claim 1, wherein the fractional FFT bins-based oscillator further compensates the LOFO by performing convolution of the spectrum of the compensated signal by the integer FFT bins-based oscillator, with an FD impulse response of the fractional FFT bins-based oscillator.

4. The FD LOFO compensation system of claim 3, wherein the convolution between the spectrum of the compensated signal and the FD impulse response of the fractional FFT bins-based oscillator is performed by a Finite Impulse Response (FIR) filter after truncating the FD impulse response to finite number of taps.

5. The FD LOFO compensation system of claim 3, wherein the FD impulse response of the fractional FFT bins-based oscillator is calculated based on a time-domain (TD) window applied to TD signal samples associated with the received signal.

6. The FD LOFO compensation system of claim 5, wherein the fractional FFT bins-based oscillator is further configured to distort the TD signal samples.

7. The FD LOFO compensation system of claim 6, wherein the FD impulse response and the TD window of the fractional FFT bins-based oscillator are defined by a Raised Cosine (RC) function.

8. The FD LOFO compensation system of claim 7, wherein the TD window is defined as:

$$H(t) = \begin{cases} 1, & |t| \leq \dfrac{1-\alpha}{2F_{ref}} \\ \dfrac{1}{2}\left[1 + \cos\left(\dfrac{\pi F_{ref}}{\alpha}\left[|t| - \dfrac{1-\alpha}{2F_{ref}}\right]\right)\right], & \dfrac{1-\alpha}{2F_{ref}} < |t| \leq \dfrac{1+\alpha}{2F_{ref}} \\ 0, & \text{otherwise} \end{cases}$$

where $F_{ref}$ is a reference frequency related to a width of the TD window, $\alpha$ is a roll-off factor of the RC and t is a given instant of time.

9. The FD LOFO compensation system of claim 7, wherein the FD impulse response of the fractional FFT bins-based oscillator is defined as:

$$h(f) = \begin{cases} \dfrac{\pi}{4F_{ref}}\operatorname{sinc}\left(\dfrac{1}{2\alpha}\right), & f = \pm\dfrac{F_{ref}}{2\alpha} \\ \dfrac{1}{F_{ref}}\operatorname{sinc}\left(\dfrac{f}{F_{ref}}\right)\dfrac{\cos\left(\dfrac{\pi\alpha f}{F_{ref}}\right)}{1 - \left(\dfrac{2\alpha f}{F_{ref}}\right)^2}, & \text{otherwise} \end{cases}$$

where $F_{ref}$ is a reference frequency related to a width of the TD window, $\alpha$ is a roll-off factor of the RC and f is a given frequency.

10. The FD LOFO compensation system of claim 3, wherein the FD impulse response of the fractional FFT bins-based oscillator is calculated based on applicable filter design algorithm.

11. The FD LOFO compensation system of claim 1 further comprising a chromatic dispersion compensator (CDC) configured to compensate chromatic dispersion in the received signal.

12. The FD LOFO compensation system of claim 1 further comprising a controller configured to initially turning off the fractional FFT bins-based oscillator, and turning on the fractional FFT bins-based oscillator during tuning of the LOFO compensation system.

13. The FD LOFO compensation system of claim 12 wherein the controller is further configured to:
  determine whether a re-tuning is required for the FD LOFO compensation system; and
  in the event of determining that the re-tuning is required, determine a number of bins by which the integer FFT bins-based oscillator is to be re-configured, and cause the fractional FFT bins-based oscillator to iteratively be configured to different frequency shifts until the fractional FFT bins-based oscillator is finally configured to a zero frequency shift.

14. A frequency domain (FD) local oscillator frequency offset (LOFO) compensation method comprising:
  compensating, by an integer Fast Fourier Transform (FFT) bins-based oscillator, LOFO in a received signal by an integer number of FFT bins; and
  compensating, by a fractional FFT bins-based oscillator, LOFO in the compensated signal by the integer FFT bins-based oscillator with a fine compensation resolution of a fractional number of FFT bins.

15. The FD LOFO compensation method of claim 14, wherein the integer FFT bins-based oscillator compensates LOFO by shifting the spectrum of the received signal by an integer number of FFT bins.

16. The FD LOFO compensation method of claim 14, wherein the fractional FFT bins-based oscillator further compensates the LOFO by performing convolution of the spectrum of the compensated signal by the integer FFT bins-based oscillator, with an FD impulse response of the fractional FFT bins-based oscillator.

17. The FD LOFO compensation method of claim 16, wherein the convolution between the spectrum of the compensated signal and the FD impulse response of the fractional FFT bins-based oscillator is performed by a Finite Impulse Response (FIR) filter after truncating the FD impulse response to finite number of taps.

18. The FD LOFO compensation method of claim 16, wherein the FD impulse response of the fractional FFT bins-based oscillator is calculated based on a time-domain (TD) window applied to TD signal samples associated with the received signal.

19. The FD LOFO compensation method of claim 18 further comprising distorting, by the fractional FFT bins-based oscillator, the TD signal samples.

20. The FD LOFO compensation method of claim 19, wherein the FD impulse response and the TD window of the fractional FFT bins-based oscillator are defined by a Raised Cosine (RC) function.

21. The FD LOFO compensation method of claim 20, wherein the TD window is defined as:

$$H(t) = \begin{cases} 1, & |t| \leq \frac{1-\alpha}{2F_{ref}} \\ \frac{1}{2}\left[1 + \cos\left(\frac{\pi F_{ref}}{\alpha}\left[|t| - \frac{1-\alpha}{2F_{ref}}\right]\right)\right], & \frac{1-\alpha}{2F_{ref}} < |t| \leq \frac{1+\alpha}{2F_{ref}} \\ 0, & \text{otherwise} \end{cases}$$

where $F_{ref}$ is a reference frequency related to a width of the TD window, $\alpha$ is a roll-off factor of the RC and t is a given instant of time.

22. The FD LOFO compensation method of claim 20, wherein the FD impulse response of the fractional FFT bins-based oscillator is defined as:

$$h(f) = \begin{cases} \frac{\pi}{4F_{ref}}\operatorname{sinc}\left(\frac{1}{2\alpha}\right), & f = \pm\frac{F_{ref}}{2\alpha} \\ \frac{1}{F_{ref}}\operatorname{sinc}\left(\frac{f}{F_{ref}}\right)\frac{\cos\left(\frac{\pi\alpha f}{F_{ref}}\right)}{1 - \left(\frac{2\alpha f}{F_{ref}}\right)^2}, & \text{otherwise} \end{cases}$$

where $F_{ref}$ is a reference frequency related to a width of the TD window, $\alpha$ is a roll-off factor of the RC and f is a given frequency.

23. The FD LOFO compensation method of claim 16, wherein the FD impulse response of the fractional FFT bins-based oscillator is calculated based on applicable filter design algorithm.

24. The FD LOFO compensation method of claim 14 further comprising compensating, by a chromatic dispersion compensator (CDC), chromatic dispersion in the received signal.

25. The FD LOFO compensation method of claim 14 further comprising initially turning off the fractional FFT bins-based oscillator, by a controller, and turning on, by the controller, the fractional FFT bins-based oscillator, during tuning of an FD LOFO compensation system.

26. The FD LOFO compensation method of claim 25 further comprising:
  determining, by the controller, whether a re-tuning is required for the FD LOFO compensation system; and
  in the event of determining that the re-tuning is required,
    determining, by the controller, a number of bins by which the integer FFT bins-based oscillator is to be re-configured, and
    causing the fractional FFT bins-based oscillator to iteratively be configured to different frequency shifts until the fractional FFT bins-based oscillator is finally configured to a zero frequency shift.

27. A frequency domain (FD) local oscillator frequency offset (LOFO) compensation system comprising:
  a fractional Fast Fourier Transform (FFT) bins-based oscillator configured to compensate LOFO in a received signal with a fine compensation resolution of a fractional number of FFT bins; and
  an integer FFT bins-based oscillator configured to further compensate LOFO in the compensated signal by the fractional FFT bins-based oscillator by an integer number of FFT bins.

* * * * *